United States Patent
Dondi (10) Patent No.: US 10,883,251 B1
(45) Date of Patent: Jan. 5, 2021

(54) MACHINE TO BACKFILL PIPELINES WITH IMPROVED LIFTING DEVICE

(71) Applicant: SCAIP S.P.A., Parma (IT)

(72) Inventor: Gian Paolo Dondi, Parma (IT)

(73) Assignee: SCAIP S.P.A., Parma (IT)

(*) Notice: Subject to any disclaimer, the term of this patent is extended or adjusted under 35 U.S.C. 154(b) by 0 days.

(21) Appl. No.: 16/440,498

(22) Filed: Jun. 13, 2019

(30) Foreign Application Priority Data

Jun. 13, 2019 (IT) .......................... 102019000008805

(51) Int. Cl.
  *E02F 5/22* (2006.01)
  *B07B 13/16* (2006.01)
  *B07B 1/00* (2006.01)
  *B07B 1/10* (2006.01)

(52) U.S. Cl.
  CPC ............ *E02F 5/226* (2013.01); *B07B 1/005* (2013.01); *B07B 1/10* (2013.01); *B07B 13/16* (2013.01)

(58) Field of Classification Search
  USPC .......... 37/305, 462, 463, 464; 305/200, 201; 405/179
  See application file for complete search history.

(56) References Cited

U.S. PATENT DOCUMENTS 3,154,351 A * 10/1964 Tucker, Sr. ............ B62D 55/20
                                              305/48
4,165,137 A *  8/1979 Stedman ................ B62D 55/28
                                             228/152
2007/0000156 A1   1/2007 Greenberg et al.
2008/0107510 A1*  5/2008 Grassi ..................... B65G 17/30
                                             414/427

FOREIGN PATENT DOCUMENTS

| DE | 924137 C | 2/1955 |
| DE | 958910 C | 2/1957 |
| DE | 977168 C | 4/1965 |
| DE | 1219857 B | 6/1966 |
| FR | 1343706 A | 11/1963 |

OTHER PUBLICATIONS

Italian Search Report dated Feb. 27, 2020 from counterpart Italian App No. 201900008805.

* cited by examiner

*Primary Examiner* — Kyle Armstrong
(74) *Attorney, Agent, or Firm* — Shuttleworth & Ingersoll, PLC; Timothy J. Klima (57) ABSTRACT

Machine for the definition of a material for the burying of pipes, especially a padding machine and/or crusher, in particular adapted to cover said pipe with the corresponding material, preferably consisting of the waste material of the excavation for laying the pipes, comprising a lifting device configured to transfer the material from a collection area to a storage area, by means of a conveyor belt comprising a plurality of sections mechanically associated to towing means, for the movement thereof, in which said sections alternate in such a way that an overlying section is continuously in an overlapping relationship with the adjacent underlying section which precedes it and which follows it.

19 Claims, 9 Drawing Sheets

MACHINE TO BACKFILL PIPELINES WITH IMPROVED LIFTING DEVICE

CROSS-REFERENCE TO A RELATED APPLICATION

This application claims priority to Italian Application No. 102019000008805 filed Jun. 13, 2019, which application is incorporated by reference herein.

FIELD OF APPLICATION OF THE INVENTION

The present finding relates to a machine for the burying of pipes, in particular arranged in a respective excavation of the ground, such as gas pipelines, oil pipelines, aqueducts or others, and in particular adapted to cover said pipe with a corresponding material.

In particular, it relates to padding machines or crushers, the lifting devices of which are adapted to transfer the covering material, or waste material of the excavation, from a collection area to a storage area for the subsequent screening or crushing.

STATE OF THE ART

When constructing pipelines, the ground is generally dug to create a ditch into which the tubes constituting said pipelines are positioned.

Generally, part of the material, which is excavated from the ground to obtain the ditch, is subsequently re-used to cover the tubes.

Preferably said material is a treated, i.e., screened material, or suitably crushed, such as not to damage the pipe or such as not to create empty zones about the same pipe, and preferably consists of the waste material of the excavation for laying the pipes.

By means of a screening or crushing system, the larger components, such as rocks or boulders, which could damage the pipes themselves, or not allow a proper compaction of the ground above the tube, are eliminated.

Machines, or padding machines, are known from the prior art, for the burying of pipes, in particular arranged in a respective excavation of the ground, such as gas pipelines, oil pipelines, aqueducts, or others, and in particular adapted to cover said pipe with a corresponding material, in particular a treated material.

Said machines comprise a main support framework of the apparatus, and generally comprise lifting devices adapted to transfer the waste material from the collection area to the storage area, for example, the screening area.

Said lifting devices are typically obtained from conveyor belts in which the waste material is loaded and transferred to the screen or a crushing device.

Conveyor belts are known from the prior art, which comprise a plurality of sections, on which the waste material rests, which are so shaped that there is a partial overlapping between a section and the one which precedes or follows it. This configuration is important in order to avoid that the transported waste material may fall in any cracks that are present between a section and the nest one, thereby being lost.

The known solutions, such as that described in document EP2076632, provide for an overlapping of the rear end of a section to the front end of the adjacent one, where front and rear are meant with reference to the advancement direction of the sections of the conveyor belt.

This involves considerable costs for the implementation said sections, since, in order to achieve the above-described overlapping, in which each rear end of a section is overlapped to the adjacent one, each section has the initial and final ends differently shaped from one another.

Said configurations requires that the processing operations are carried out with different equipment and configurations, for example, the bends, by different bending tools.

Consequently, this involves long and expensive production times.

DISCLOSURE AND ADVANTAGES OF THE FINDING

The technical problem underlying the present invention is to provide a machine for the burying of pipes, especially a padding machine, wherein a lifting device of the waste material is structurally and functionally devised to overcome one or more of the limitations set forth above with reference to the cited prior art.

Within the scope of the above-mentioned problem, main object of the invention is to develop a machine for the burying of pipes with a lifting device which allows obtaining a rational solution, which allows a reduction of the manufacturing costs for the manufacturing thereof.

A further object of the invention is also to provide to the art a machine for the burying of pipes with a lifting device, in view of a solution which allows achieving the maximum transport efficiency of waste material, reducing losses during the lifting thereof.

Such and other objects are achieved by virtue of the characteristics of the invention set forth in the independent claims. The dependent claims outline preferred and/or particularly advantageous aspects of the invention.

In particular, the present invention provides a machine for the burying of pipes, especially a padding machine, in particular adapted to cover said pipe with a corresponding material, preferably consisting of the waste material of the excavation for laying the pipes. Said machine comprises a lifting device configured to transfer the material from a collection area to a storage area, by means of a movable conveyor belt comprising a plurality of sections mechanically associated to towing means for the movement thereof, in which said sections alternate in such a way that an overlying section is continuously in an overlapping relationship with the adjacent underlying section which precedes it and which follows it.

By virtue of this configuration, the efficiency of the conveyor belt is improved, since excessive amounts of the material are prevented from falling through said sections.

A preferred embodiment provides that each section comprises, respectively, a front end and a rear end with respect to the advancement direction of the conveyor belt, in which both the front end and the rear end of the overlying section overlap respectively at the rear end and at the front end of the adjacent underlying sections.

In fact, the sections comprise a substantially flat central body, which extends between the front end and the rear end. Preferably said central body and the front ends and the rear end of the sections are symmetrical with respect to a symmetry plane orthogonal to the advancement direction of the same sections.

By virtue of this solution, the manufacturing of the sections is simplified at the production level.

In fact, the front and rear ends are equal and symmetrical for each section, therefore they need the same processing, without changing tools or configurations.

Said objects and advantages are all achieved by the machine for the burying of pipes with lifting device that is the subject matter of the present finding, which is characterized by what has been provided in the claims set forth herein below.

BRIEF DESCRIPTION OF THE FIGURES

This and other characteristics will be more clearly understood from the following description of some embodiments, which are illustrated by way of non-limiting example in the attached drawing tables.

DESCRIPTION OF THE FINDING

Figure 1:
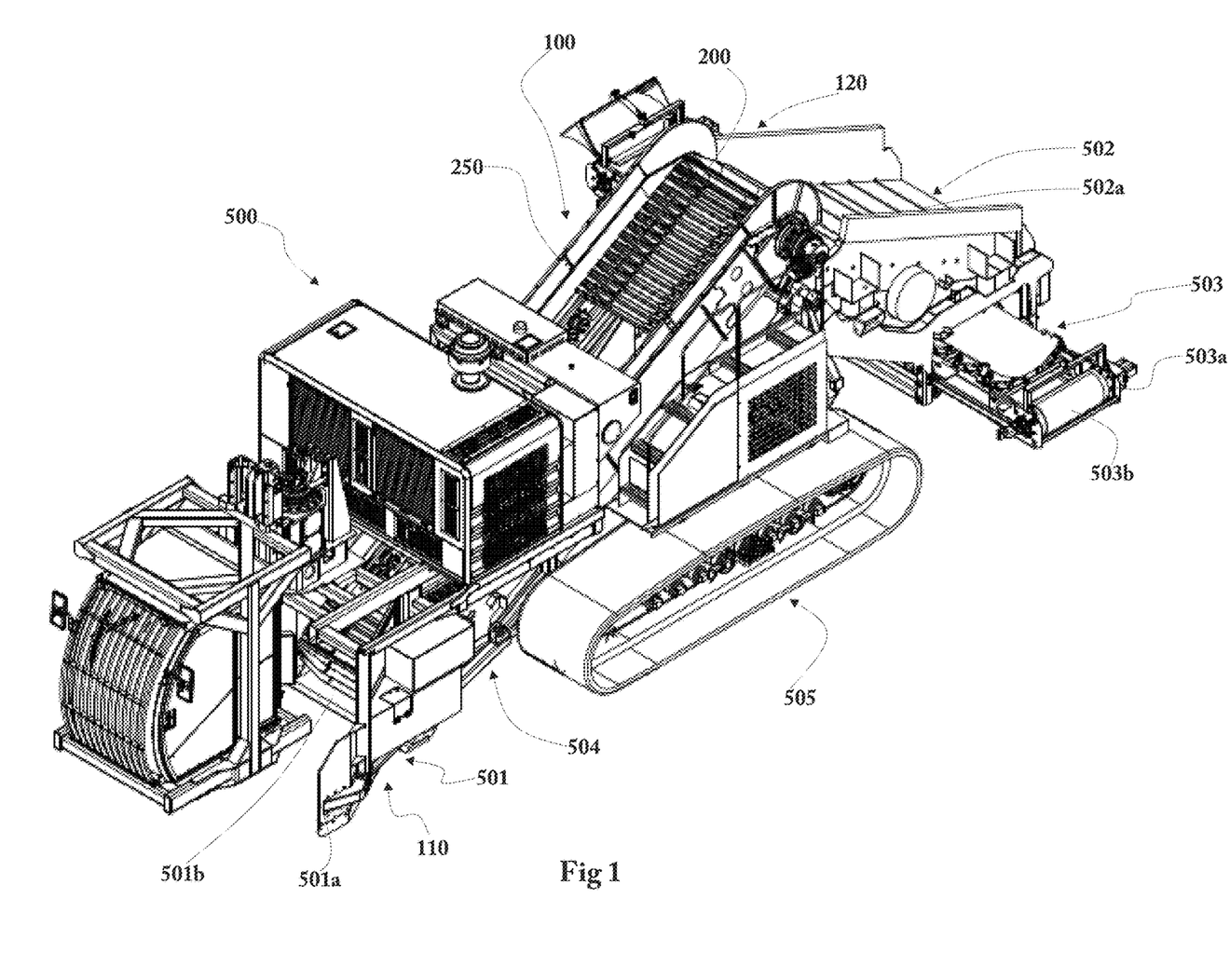
FIG. 1: illustrates a perspective, schematic view of a preferred implementation of machine or padding machine according to the present finding.
Figure 1A:
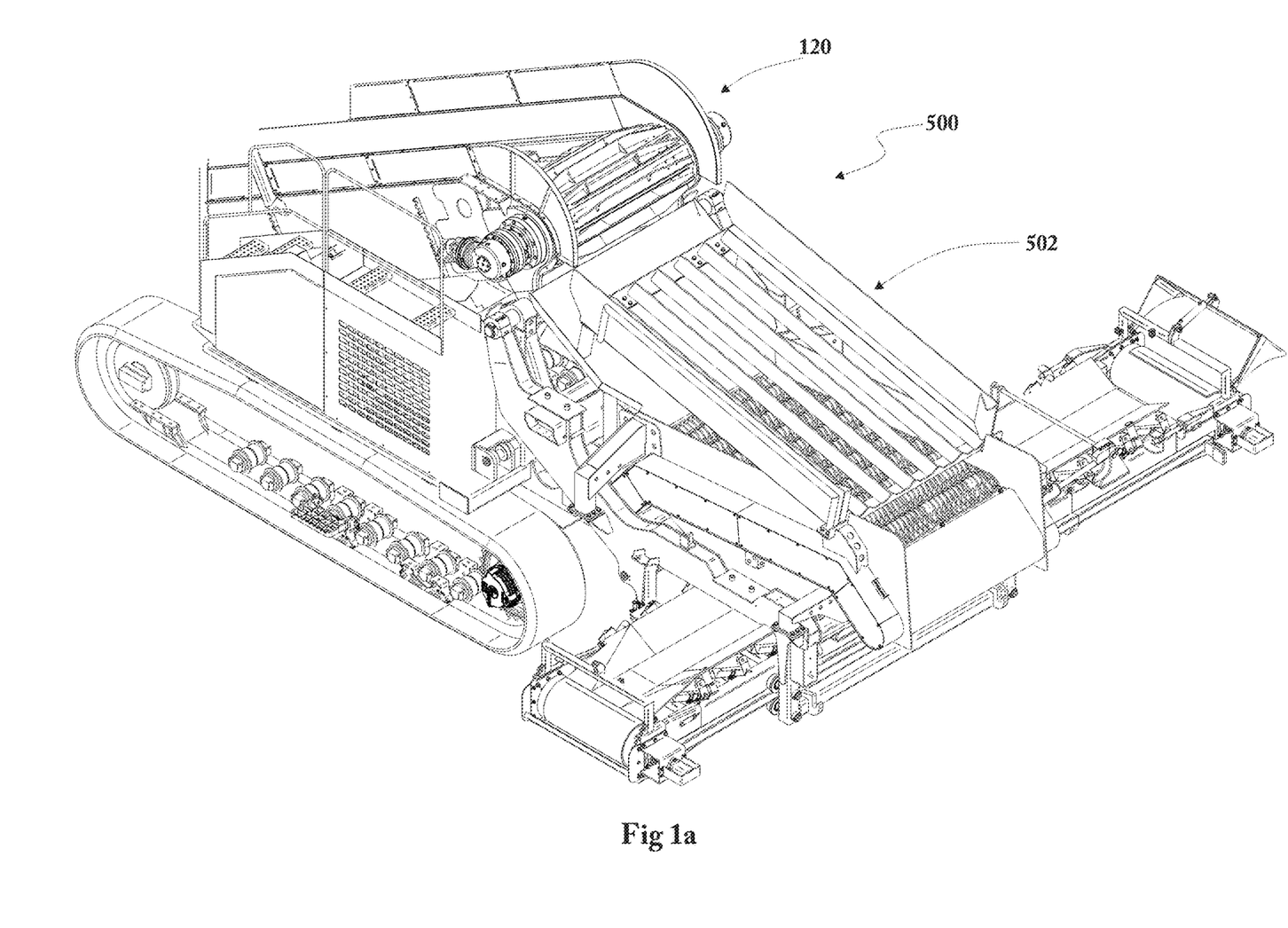
FIG. 1a: illustrates a perspective, schematic view of a preferred implementation of machine of the star screen type according to the present finding.
Figure 1B:
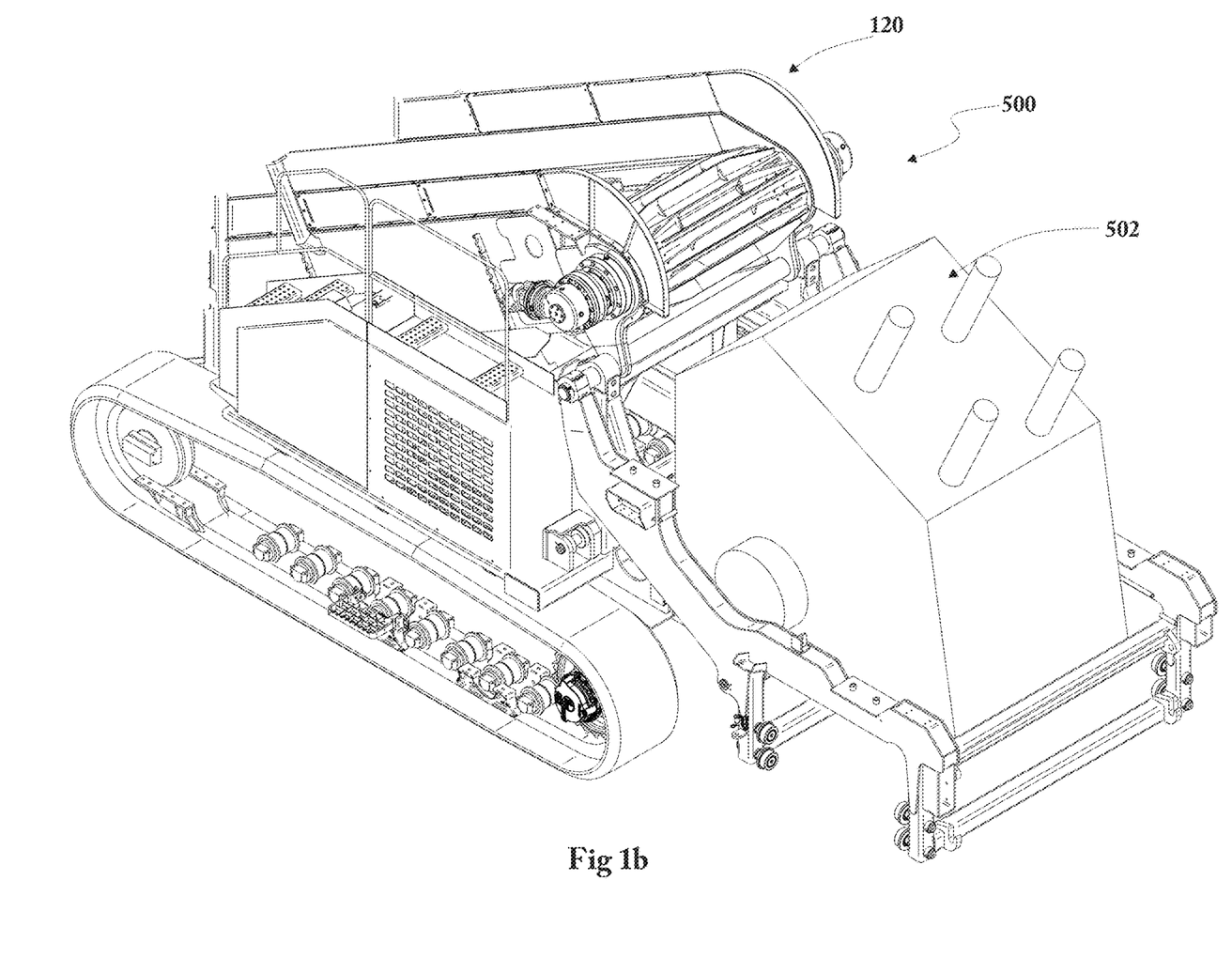
FIG. 1b: illustrates a perspective, schematic view of a preferred implementation of machine of the crusher screen type according to the present finding.
Figure 2:
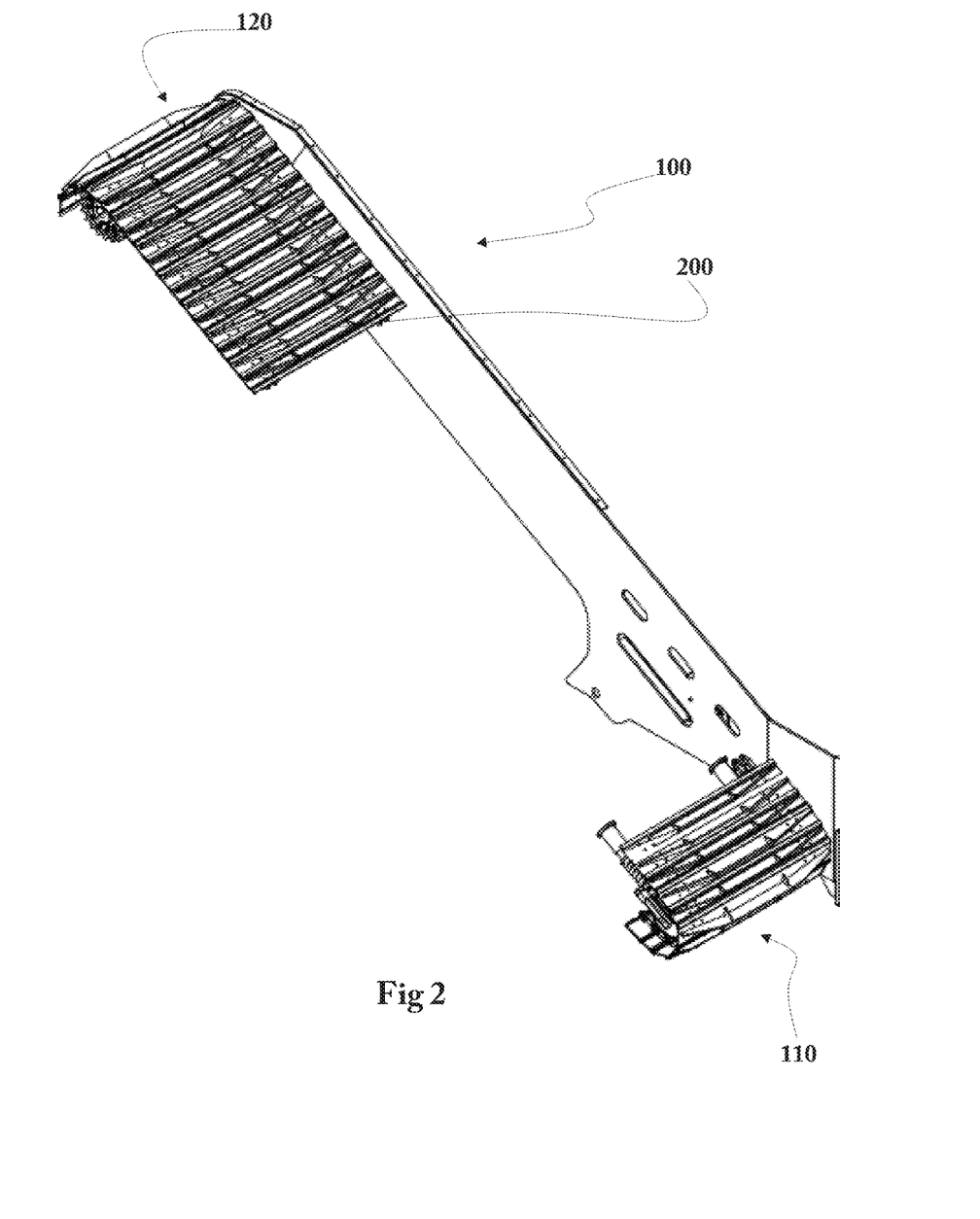
FIG. 2: illustrates a schematic axonometric view of a preferred implementation of a lifting device according to the present finding.

With particular reference to FIGS. 1, 1a, and 1b, a machine 500 for the definition of a material for the burying of pipes according to the present invention is illustrated, in particular a preferred implementation of said machine for the burying of pipes, especially a padding machine or crushers.

By the term definition of a material is meant that the machine may provide both a selection of a predetermined dimension of material, when the machine is of the padding machine type, and provide an intervention on the material itself in order to obtain a predetermined dimension of said material, when the machine is of the crusher type.

Said pipes are in particular located in a respective excavation of the ground, for example gas pipelines, oil pipelines, aqueducts, or others.

The machine 500 provides for covering said pipe with a corresponding material, especially a treated, i.e., screened, material, as represented in FIG. 1, 1a, or a crushed material, as represented in FIG. 1b, such as not to damage the pipe or such as not to create empty zones about the same pipe, and preferably consisting of the waste material of the excavation for laying the pipes.

Especially, FIG. 1 illustrates a padding machine, FIG. 1a illustrates a screen of the star type in which the rotors are arranged under protection and pre-selection bars, both configured to select a predetermined dimension of material, while FIG. 1b illustrates a screen crusher providing for an intervention on the material itself in order to obtain a predetermined dimension of said material.

In particular, the machine 500 comprises a main support framework 504 of the apparatus, which extends according to a respective longitudinal axis of the same machine 500.

In particular, as it is inferred from FIG. 1, in the machine 500, means 505 for the advancement of the machine 500 with respect to the ground, in particular in the form of rotatable means are provided, which engage the ground and support said main support framework 504, and preferably a first and a second side tracks for the advancement and support of the machine 500 on the ground.

The machine 500 preferably includes a collection assembly 501 of the waste material collected from the ground.

Typically, said material can be the same material which has been previously excavated to obtain the excavation in which the pipes have to be arranged.

In particular, as it is inferred from FIG. 1, the collection assembly 501 of the pipe covering material, in particular for the collection of said material from the ground, preferably comprises an element 501b for the separation of said material, in particular in the form of a horizontal cutting element.

In particular, as it is inferred from the figure, the machine has means, or apparatus 503 for discharging the material, in particular the treated material, above said pipes, and especially into the housing excavation of the same pipe, in particular said means, or apparatus 503 for discharging the material are adapted to laterally extend, beyond the respective side of said machine 500, in particular at both sides of the same machine 500, and preferably are in the form of a respective conveyor belt having a support frame 503a supported by said main support framework 504 of said machine 500 and an endless belt 182 rotatable on said support frame.

In particular, as it can be inferred from FIG. 1, in the machine 500, means, or apparatus 502 are provided, for the treatment of said material, in particular in the form of means, or apparatus, for screening said material, in particular including a perforated plate 502a, preferably extending from the top down, according to the rear direction with respect to the machine 500, on which plate 502a said material is dropped, which material falls, passing through the screen on the upstream end of said means, or apparatus 503 for discharging the material, while that portion of the material that does not pass through the screen is preferably discharged at the rear of the same machine 500.

However, it shall be understood that said perforated plate 502a could also be substituted by a convenient net suitable to the purpose.

Furthermore, as represented in FIGS. 1a and 1b, the machine 500 could comprise means 502 for the treatment of the material, which can be in the form of the screen cited above, or they can also be defined by corresponding bars or rotors adapted to perform the same function represented in FIG. 1a, or in the form of a corresponding crusher, adapted to crush the boulders or hard material of said material, in order to reduce the dimensions thereof, represented in FIG. 1b.

In particular, as it is inferred from the figures, in the machine 500, a lifting device 100 configured to transfer the excavated waste material from a collection area 110 to a storage area 120 is provided.

Said collection area 110 and storage area 120 are, for example, the collection assembly 501 and the treatment apparatus 502.

Said lifting device 100 is preferably in the form of a respective ascending conveyor belt 200, extending between the collection area 110 and the storage area 120.

Said collection area 110 is preferably arranged at a lowered end upstream, with respect to the advancement direction of the machine 500, substantially at the level of the ground, which receives the material through the collection assembly 501 of the tube covering material.

As illustrated, said lifting device 100 is preferably preceded by the collection assembly 501 of the material, which has opposite side small edges 501a for holding the material, which small edges extend, diverging from each other, anteriorly to said conveyor belt 200, with respective ends, which are arranged at the same ground and provide for centrally conveying the material on said conveyor belt 200.

Said storage area 120 is preferably arranged at a lifted end downstream, with respect to the advancement direction of the machine 500, which lets the material fall on said means, or apparatus 502 for the treatment of said material.

Said lifting device 100 preferably comprises a support frame 250, which is supported by said main support framework 504 of said machine 500, and an endless conveyor belt 200 rotatable on said support frame 250.

The waste material rests on and is transferred to the conveyor belt 200.

For the movement of the conveyor belt 200, the lifting device 100 further comprises towing means 203 configured to be operatively connected to a transmission element 202.

As represented in the figure, the towing means 203 are for example a chain 203a preferably comprising a plurality of links 204 hinged to one another.

Consequently, in the case where the towing means 203 are of the chain type 203a, they can be operatively connected to a transmission element 202, for example, they can mesh with a pinion or a crown, or alternatively, any transmission elements that those skilled in the art find as suitable.

Said transmission element 202 is preferably integral to a pin 202a, actuated so as to rotate by means of actuation devices, such as electrical, hydraulic motors, etc.

According to an embodiment, the conveyor belt 200, on which the waste material rests, is therefore movable and comprises a plurality of sections 210, 220 each mechanically associated to the towing means 203, for the movement thereof.

A preferred embodiment provides that said sections 210, 220 are mechanically associated to two or more towing means 203 for example two chains 203a arranged in the proximity of the side edges 218, 219 and 228, 229, of the sections 210, 220; by side edges 218, 219 and 228, 229 the end areas of the length of each section 210, 220 are meant, where by length is meant the extension of the section 210, 220 in an orthogonal direction with respect to an advancement direction X of the conveyor belt 200.

In the lifting devices 100 having larger dimensions, said sections 210, 220 can be mechanically associated, for example, to three towing means 203, for example three chains 203a arranged, besides in the proximity of the side edges 218, 219 and 228, 229, also centrally.

Figure 3:
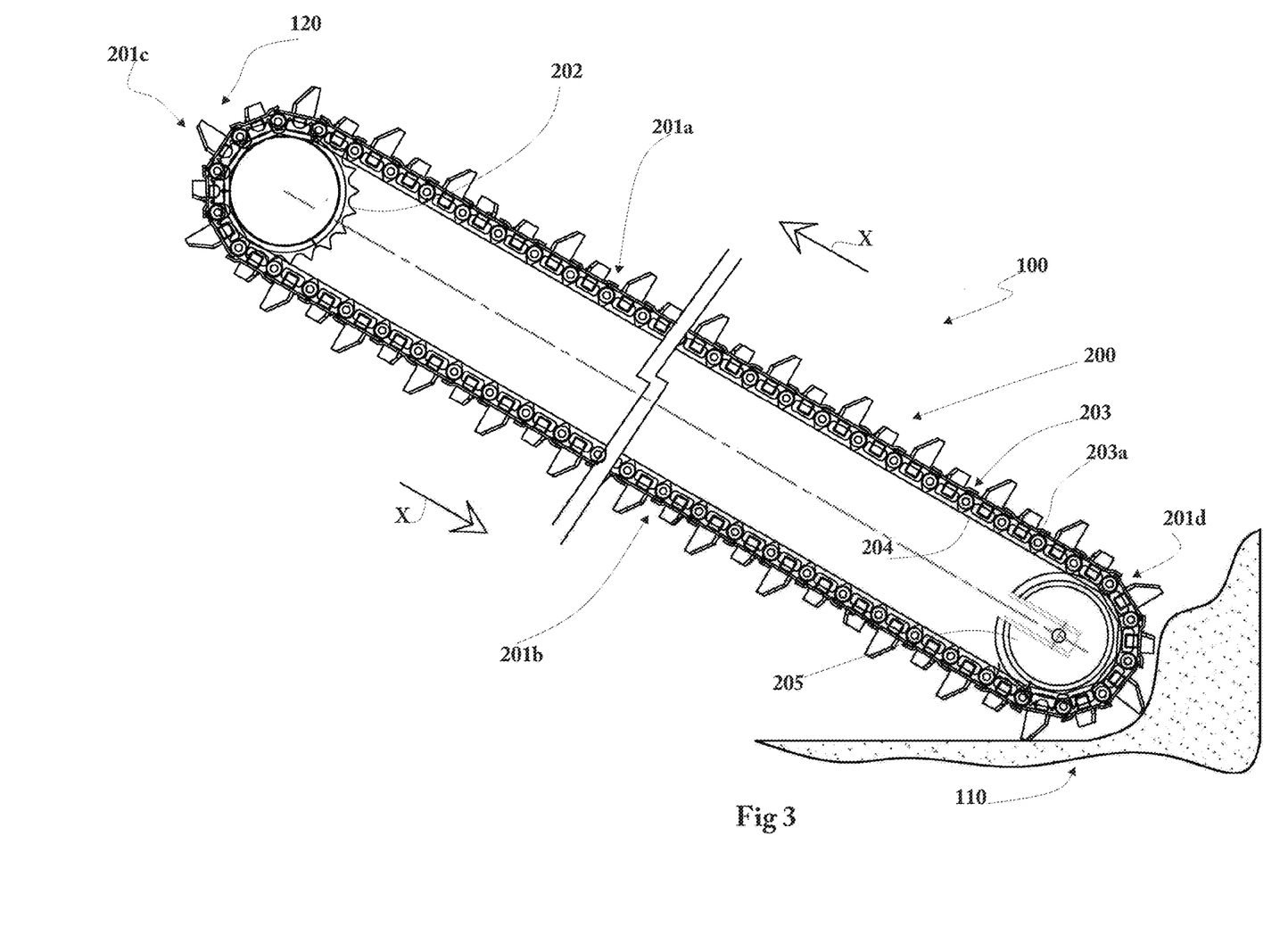
FIG. 3: illustrates a schematic side view of a preferred implementation of a lifting device according to the present finding.

As represented in FIG. 3, the lifting device 100 further comprises a return element 205 about which the towing means 203 wind, and therefore about which the conveyor belt 200 rotates.

In this manner, said conveyor belt 200 is shaped as a closed ring, hence being endlessly rotatable.

In the case that the towing means 203 are of the chain type 203a, the return element 205, can be for example a rotatable pinion or crown, or wheel, or, alternatively, a fixed pad or any return element that those skilled in the art find as suitable.

A preferred embodiment provides that, since said conveyor belt 200 is shaped as a closed ring, it comprises an upper portion 201a, on which the waste material rests for the lifting thereof, and a lower portion 201b facing the ground.

Said upper portion 201a, and lower portion 201b are preferably rectilinear and preferably arranged inclined with respect to the ground.

The upper portion 201a, and the lower portion 201b are joined by a first curvilinear portion 201c, of the conveyor belt 200, arranged at the top of the lifting device 100 and by a second curvilinear portion 201d, of the conveyor belt 200, arranged at the bottom of the lifting device 100.

Said first curvilinear portion 201c is located at the storage area 120, while the second curvilinear portion 201d is located at the collection area 110.

In particular, as represented in FIG. 3, the first curvilinear portion 201c winds about the transmission element 202, while the second curvilinear portion 201d winds about the return element 205.

Said solution is preferred, since it optimizes the movement of the towing means 203, which operate by towing in the loaded part, i.e., at the upper portion 201a on which the material is present.

Nevertheless, on the contrary, the first curvilinear portion 201c winds about the return element 205, while the second curvilinear portion 201d winds about the transmission element 202, even if said configuration involves that the towing means 203 have to operate by a thrust in the loaded part, i.e., at the upper portion 201a on which the material is present.

Figure 4:
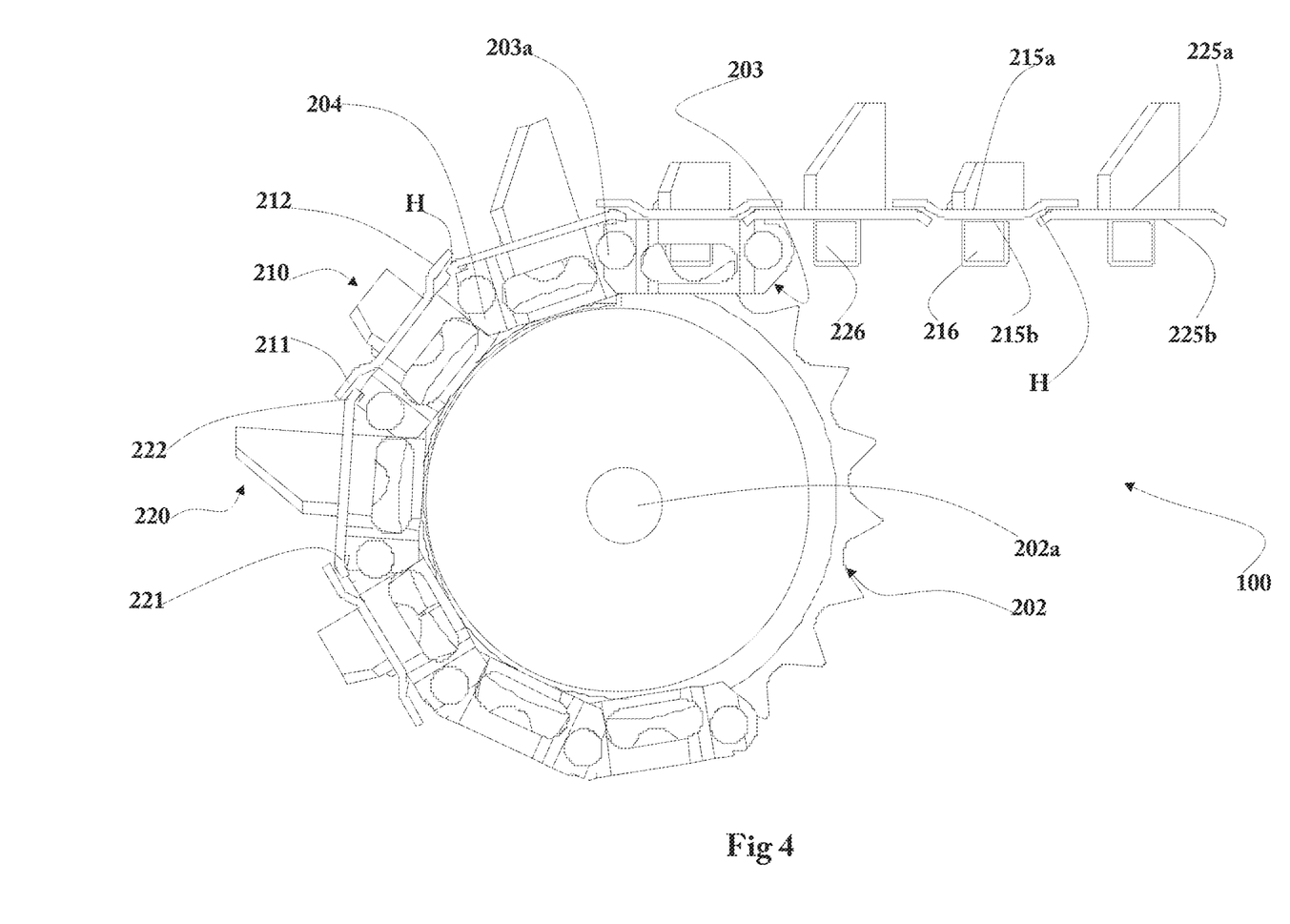
FIG. 4: illustrates a schematic magnification of a preferred implementation of the conveyor belt according to the present finding.
Figure 5:
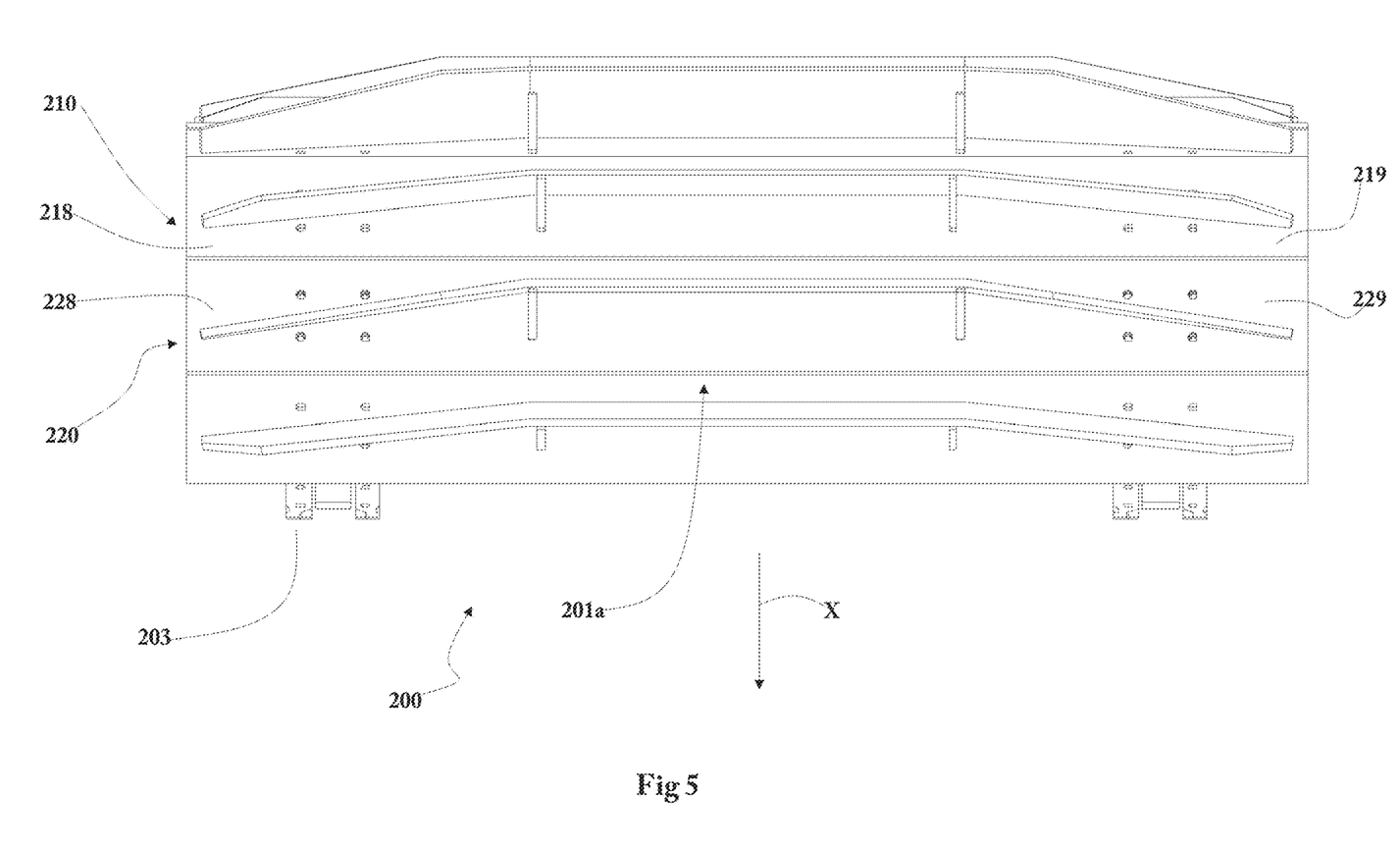
FIG. 5: illustrates a top view of a preferred implementation of a sequence of sections of the conveyor belt according to the present finding.

As represented in FIGS. 3 and 4, the conveyor belt provides that the sections 210, 220 are installed on the towing means 203, and in particular on the chain 203a.

Preferably, each section 210, 220 is integral and/or mechanically connected, to the respective link 204 of said chain 203a.

According to a preferred embodiment, the sections 210 and 220 have at least two different configurations, and in particular the invention defines one section, which will be referred to as overlying section 210, and one section, which will be referred to as underlying section 220.

Said sections 210, 220 are preferably arranged so that an overlying section 210 is followed by an underlying section 220, and so on.

According to an aspect of the finding, the overlying section 210 is continuously in an overlapping relationship with the adjacent underlying section 220 which precedes it and which follows it with respect to the advancement direction X of the conveyor belt 200.

Said continuous overlapping prevents excessive amounts of the material from falling through said sections 210, 220, thereby compromising the efficiency of the conveyor belt.

In accordance with an aspect of the invention, each section 210, 220 comprises respectively a front end 211, 221 and a rear end 212, 222, with respect to the advancement direction X of the conveyor belt 200.

In particular, as represented in FIGS. 3 and 4, both said front end 211 and said rear end 212 of the overlying section 210 overlap respectively at the rear end 222 and at the front end 221 of the adjacent underlying sections 220.

That is, said front end 211 of the overlying section 210 overlaps the rear end 222 of the adjacent underlying section 220 which precedes it, while the rear end 212 of the overlying section 210 overlaps the front end 221 of the adjacent underlying section 220 which follows it.

A possible embodiment provides that both the front end 211 and the rear end 212 of the overlying section 210 overlap respectively at the rear end 222 and at the front end 221 of the adjacent sections 220, leaving a variable spacing H during the winding of the conveyor belt 200 about the transmission element 202 on which the towing means 203 mesh, and/or about the return element 205 on which the towing means 203 wind.

Said sections 210, 220 comprise preferably a substantially flat central body 215, 225, which extends between the front end 211, 221 and the rear end 212, 222.

An embodiment provides that the central body 215, 225 is mechanically connected to the towing means 203; in particular in the case where said means are a chain 203a, the central body 215, 225 is preferably arranged parallel to the axis connecting the two fulcrums of rotation of each link 204 of the chain 203a.

Figure 7:
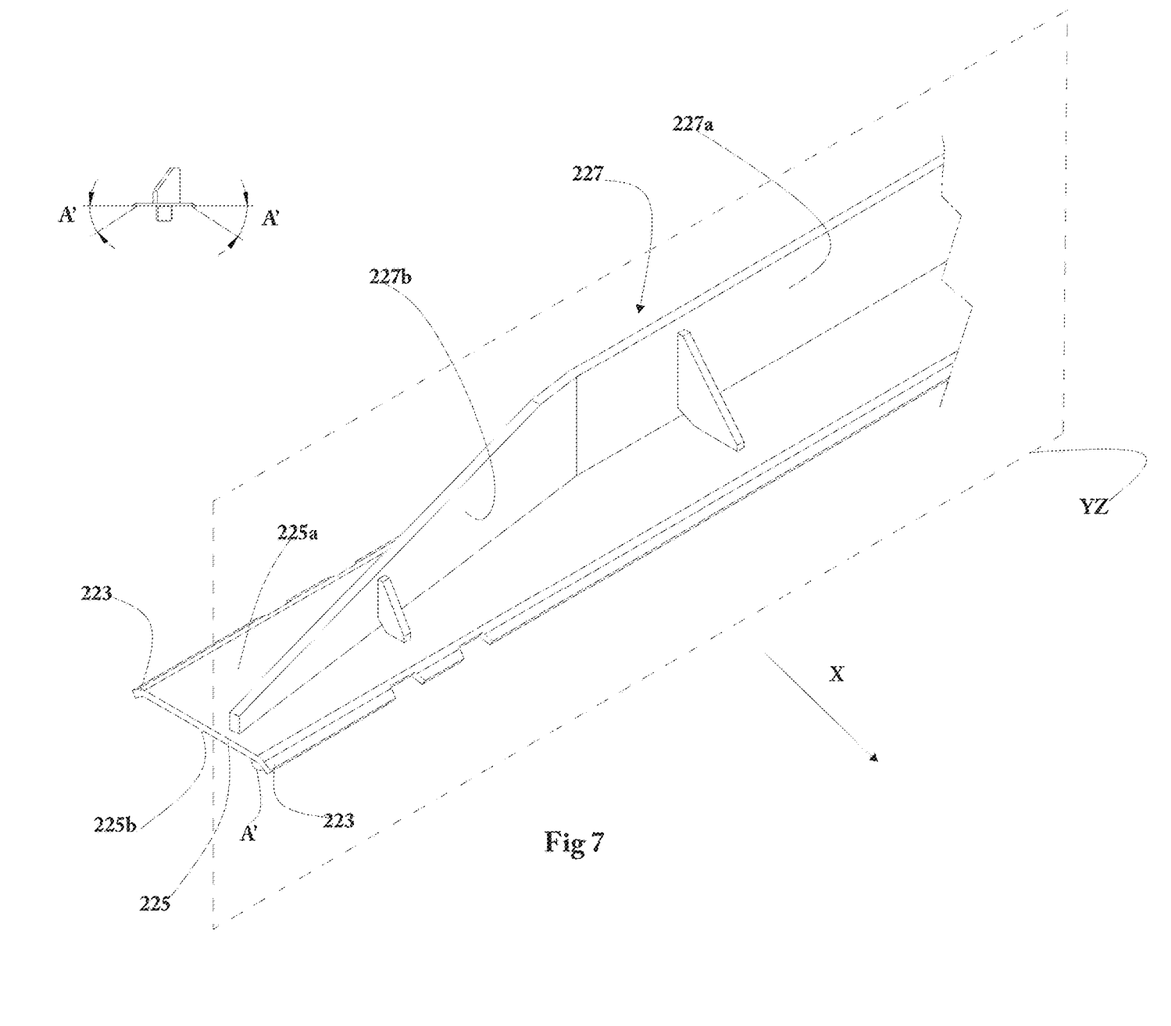
FIG. 7: illustrates an axonometric view of a preferred implementation of an underlying section of the conveyor belt according to the present finding.

Preferably the central body 215, 225 and the front ends 211, 221 and the rear end 212, 222 of the sections 210, 220 are symmetrical with respect to a symmetry plane YZ orthogonal to the advancement direction X of the section 210, 220. In particular said plane of symmetry YZ, as represented in FIGS. 7, 8, passes through the center of the central body 215, 225.

By virtue of said configuration, the section 210, 220 can be obtained in a simple, rapid manner. In fact, by virtue of the symmetry, as it will be more fully described herein below, the processing operations, for example, the bends, to be carried out do not require changes of tools, such as, for example, bending knives.

Figure 6:
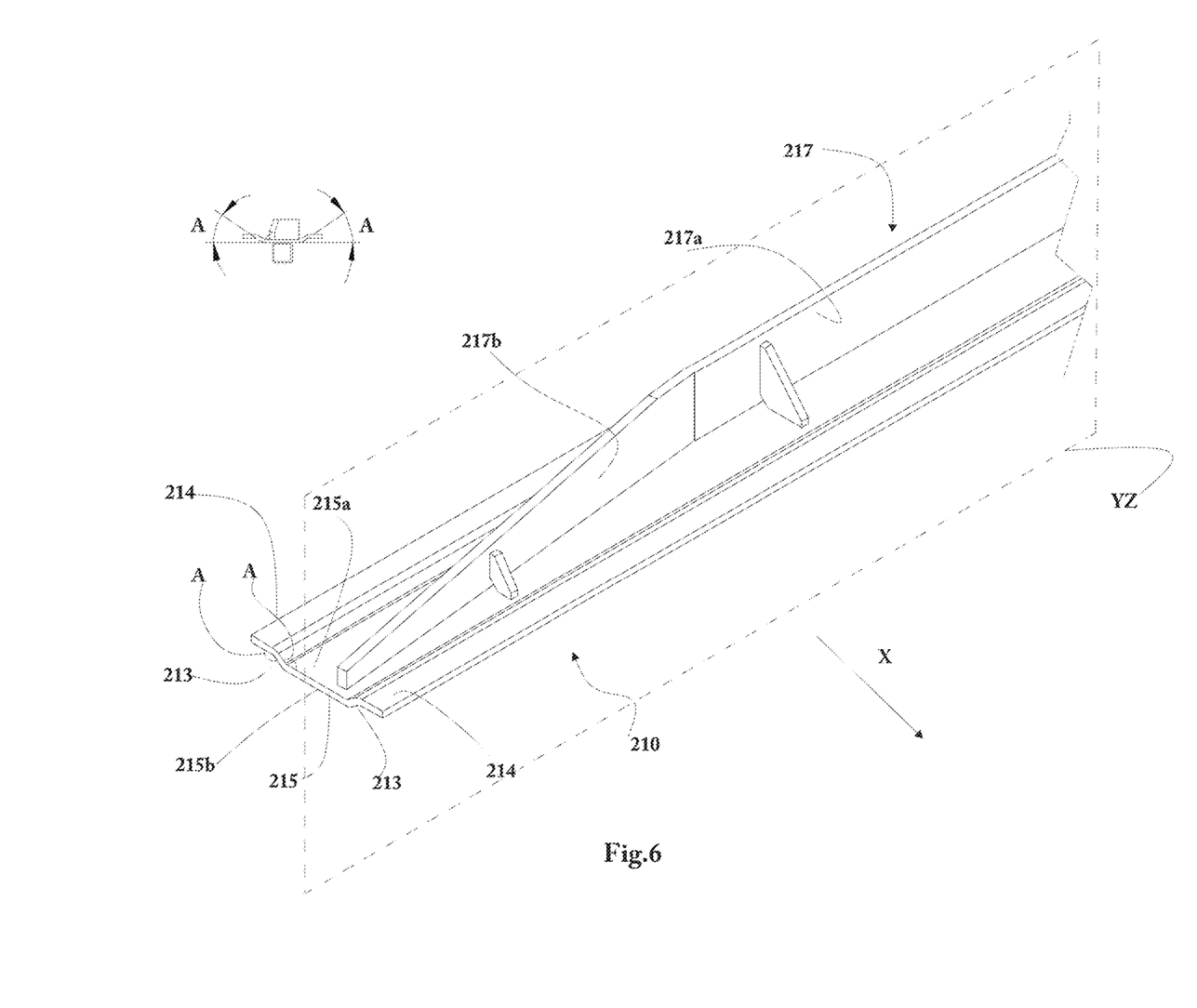
FIG. 6: illustrates an axonometric view of a preferred implementation of an overlying section of the conveyor belt according to the present finding.

In accordance with possible embodiments, as represented in FIG. 6, the front end 211 and the rear end 212 of the overlying sections 210 comprise a flat element 214 substantially parallel to the central body 215 connected thereto, by means of a connecting element 213 facing away from the towing means 203, for example moving away from the link 204 of the chain 203a.

In particular the connecting element 213 forms an angle A with the central body 215.

The angle A is preferably the same as the angle formed between the connecting element 213 and the flat element 214.

In particular, the angle A, between the connecting element 213 and the central body 215, is configured to allow the maximum curvature of the towing means 203, for example of the chain 203a, on the transmission element 202 and/or on the return element 205.

As regards the underlying sections 220, an embodiment represented in FIG. 7 provides that the front end 221 and the rear end 222 comprise an angled element 223 connected to the central body 225 and facing the towing means 203, i.e., the link 204 of the chain 203a. The angled element 223 forms an angle A' with the central body 225, for example by means of a sharp edge connection, or a junction having a curvature radius that is suitable to the link 204 of the chain on which the section 220 is installed.

In this case also, the angle A' between the angled element 223 and the central body 225 is preferably configured to allow the maximum curvature of the towing means 203, for example of the chain 203a, on the transmission element 202 and/or on the return element 205.

A preferred embodiment provides that the angles A and A' are substantially similar.

Except for tolerances that are known to those skilled in the art, said angles A and A' are further preferably equal.

For example, a preferred embodiment provides that A can be equal to 35°, and A' can be equal to 33°, when, for example, the maximum curvature of the towing means 203 is about 35°.

This improves the overlapping and simplifies the processing required for the production of the sections 210 and 220, since it is possible to always use the same knives to obtain the bends, without needing to change the equipment.

Furthermore, the connecting element 213 and the angled element 223 are positioned preferably so that, in the rectilinear length of the belt 200, for example in the upper 201a and lower 201b portions, they are perfectly overlapping, or facing each other, as represented in FIG. 4.

The sections 210 and 220, according to the constructive form described above, can be made by bending a plate or metal sheet.

The advantage of the constructive form of the sections 210 and 210 is that their manufacturing is simplified at a productive level.

In fact, the front 211, 221 and rear 212, 222 ends are equal and symmetric for each section 210, 220, therefore they need the same processing, without changing tools or configurations.

In particular the underlying section 220 is especially quick to be produced, and with low production costs.

For example, for the implementation of the underlying section 220, the blank, i.e., for example, the laid metal sheet, is inserted into the bending machine to obtain the first bend, for example at the front end 221, thus obtaining the first angled element 223; the thus-obtained working piece is taken and positioned again into the bending machine rotated by 180°, and then the second bend is created, at the rear end 222, to obtain the second angled element 223.

The implementation of the overlying section 210 is also easy.

In fact, the characteristic that the central body 215 and the flat element 214 are parallel makes so that the bending angle (A) of the two bends to be obtained is the same.

Also for the implementation of the overlying section 210, the laid metal sheet is inserted into the bending machine and the first bend is obtained, for example on the front end 211, between the central body 215 and the first connecting element 213; the thus-obtained working piece is taken and positioned again into the bending machine, while being arranged upside-down and then the second bend is created between the first connecting element 213 and the flat element 214; the thus-obtained working piece is taken and positioned again into the bending machine, while being rotated by 180°, and the bends on the rear end 212 are created in the same manner described above.

A characteristic of the finding provides that each section 210, 220 comprises, at the central body 215, 225, a reinforcement element 216, 226, in particular installed on an inner face thereof 215b, 225b facing the towing means 203, for example, the chain 203a.

As represented in the figure, said reinforcement element 216, 226 can be, for example, a tubular piece.

Main object of the reinforcement element 216, 226 is to increase the resistant section of each section 210, 220, so that it may oppose the flexure that is due to the load of material present in the upper portion 201a, and also oppose the torsion due to the fact that each section 210, 220 is mechanically connected, for example, to two chains 203a which could not even be exactly phased.

Said reinforcement element 216, 226 can be for example directly welded on the inner face 215b, 225b of the sections 210, 220, or be removably connected by means of screws or similar securing elements.

A further aspect of the invention, as represented in the figure, provides that the section 210, 220 comprises a deflector element 217, 227 for collecting and transferring the waste material.

Said deflector element 217, 227 is installed preferably at the central body 215, 225 and in particular an outer face 215a, 225a thereof opposite the inner face 215b, 225b.

The deflector element is shaped so as to pick up the material from the collection area 110, conveyed by the collection assembly 501 of the tube covering material.

The material is centrally conveyed on the conveyor belt 200, by the opposite holding small edge 501a, which extend, diverging from each other, anteriorly to said conveyor belt 200, with respective ends arranged at the same ground.

Furthermore, the deflector element 217, 227 is shaped so as to hold the collected material to lift it along the upper portion 201a and to allow the discharge thereof into the storage area 120.

In particular as represented in FIGS. 3 and 4, the deflector element 217 associated to the overlying section 210 preferably has a lower height than the deflector element 227 associated to the underlying section 220.

This configuration is due to the fact that the underlying section 220 is the one having a single bend at the front 221 and rear 222 ends, and therefore it is the one having a lesser section that is resistant to flexural and torsional stresses.

The fact that a higher deflector element 227 is associated thereto, increases the flexural strength and torsion thereof.

On the contrary, the overlying section 210, with two bends at the front and rear ends 211 and 212, is the one having a larger section that is resistant to flexural and torsional stresses. Therefore, in such a case, the association therewith of a high deflector element 217 can be omitted, which would excessively increase the weight of the conveyor belt to be moved, resulting in consequences on the larger size of the mechanical components and the actuation devices, such as electrical, hydraulic motors, etc.

Preferably, the overlying section 210 will have a deflector element 217 which is lower than the deflector element 227 mechanically associated thereto, having a height sufficient for receiving, holding, lifting, and depositing the material.

The fact that the overlying section 210 preferably provides a deflector element 217 which is lower than the deflector element 227 provided on the underlying section 220 facilitates the assembling, since it provides always a high deflector element 227 alternated with a low deflector element 217. Therefore, the possibility of errors by the operator in charge for the assembling of the conveyor belt 200 will be reduced.

As represented in FIGS. 6 and 7, said deflector element 217, 227 can be, for example, directly welded on the outer face 215a, 225a of the sections 210, 220 or be removably connected by means of screws or similar securing elements.

An example of a specific form of the deflector element 217, 227 is the one represented in FIGS. 6 and 7, in which it comprises for example a plate 217a, 227a arranged parallel to the plane of symmetry YZ and preferably placed in the central area of the section 210, 220.

Said plate 217a, 227a extends from the central area towards the side edges 218, 219 and 228, 229, defining folded wings 217b, 227b whose inclination is in accordance with the advancement direction X.

Furthermore, reinforcements such as ribs supporting the plate 217a, 227a and/or the folded wings 217b, 227b and which discharge their load on the section 210, 220 can be present.

Said configuration of the deflector element 217, 227 is merely an example, which does not limit the protection scope of the finding. Therefore, any alternative solution that those skilled in the art find as suitable to the same functions falls within the protection scope.

A preferred implementation form provides that the deflector element 227 associated to the underlying section 220 is installed at the outer face 225a of the central body 225, in a rearward position, that is, moved in the opposite direction to the advancement direction X with respect to the plane of symmetry YZ of the underlying section 220. Preferably, the deflector element 227 is arranged in the proximity of the front end 211 of the adjacent overlying section 210 which follows it.

Therefore, once the belt 200 has been mounted, the plate 227a of the underlying section 220 will be located, for example, at a distance of some mm from the front end 211 of the adjacent overlying section 210 which flows it with respect to the advancement direction X of the conveyor belt 200.

By virtue of this solution, the possibility that the material may insert between the front end 211 of the overlying section 210 and the rear end 222 of the underlying section 220, as it would tend to spontaneously do, above all in the ascending upper portion 201a, is greatly reduced.

Therefore, by virtue of this solution, the loss of material is reduced, to the advantage of the efficiency of the lifting device 100.

In particular, this effect is pointed out in the upper portion 201a, on which the waste material rests during the lifting thereof. Considering that the upper portion 201a is the longest length of the conveyor belt 200 on which the material is present, it is clear that the advantageous effect is considerable.

Object of the finding is also a lifting device 100 that can be installed on a machine 500 for the burying of pipes, especially a padding machine, in particular adapted to cover said pipe with a corresponding material, preferably consisting of the waste material of the excavation for laying the pipes.

Said lifting device 100 is configured to transfer the material from a collection area 110 to a storage area 120, being obtained according to at least one of the characteristics described above.

However, it is intended that what has been described above is of a non-limiting, exemplary value; therefore, any detail variations that would be necessary due to technical and/or functional reasons are as of now considered to fall within the same protecting scope defined by the claims set forth herein below.

The invention claimed is:

1. A machine for definition of a material for burying pipe, comprising:
   a lifting device configured to transfer the material from a collection area to a storage area, the lifting device including:
      a conveyor belt comprising:
         a towing chain,
         a plurality of sections connected to the towing chain for moving the plurality of sections:
         the plurality of sections including overlying sections alternating with underlying sections in such a way that one of the overlying sections is continuously in an outwardly overlapping relationship with both an adjacent one of the underlying sections that precedes the one of the overlying sections in an advancement direction of the conveyor belt and an adjacent one of the underlying sections that follows the one of the overlying sections in the advancement direction.

2. The machine according to claim 1, wherein each of the underlying and overlying sections comprises respectively a front end and a rear end, with respect to the advancement direction of the conveyor belt, in which front end and the rear end of the one of the overlying sections overlaps respectively at the rear end of the adjacent one of the underlying sections that precedes the one of the overlying sections and at the front end of the adjacent one of the underlying sections that follows the one of the overlying sections.

3. The machine according to claim 2, wherein the front end and the rear end of the one of the overlying sections comprise a flat element parallel to the central body and connected to the central body by a connecting element forming an angle with the central body, the connecting element extending away from the towing chain.

4. The machine according to claim 3, wherein the front end and the rear end of each of the underlying sections comprise an angled element connected to the central body and forming an angle with the central body, the angled element extending toward the towing chain.

5. The machine according to claim 4, wherein the conveyor belt further includes a transmission element and a return element for moving the towing chain and wherein the angle between the connecting element and the central body and the angle between the angled element and the central body are configured to allow a maximum curvature of the towing chain on at least one chosen from the transmission element and the return element.

6. The machine according to claim 4, wherein the angle between the connecting element and the central body and the angle between the angled element and the central body are similar and the connecting element and the angled element are positioned so that at least in atm rectilinear length of the conveyor belt, the connecting element and the angled element are overlapping, or facing each other.

7. The machine according to claim 1, wherein the towing chain comprises a plurality of links hinged to one another.

8. The machine according to claim 7, wherein each of the plurality of sections is mechanically connected to one of the plurality of links, respectively.

9. The machine according to claim 1, wherein each of the plurality of sections comprises respectively a front end, a rear end and a flat central body, which extends between the front end and the rear end.

10. The machine according to claim 9, wherein the flat central body, the front end and the rear end are symmetrical with respect to a symmetry plane orthogonal to the advancement direction.

11. The machine according to claim 9, wherein the flat central body is mechanically connected to a link of the towing chain and arranged parallel to an axis connecting two fulcrums of rotation of the link.

12. The machine according to claim 9, wherein each of the plurality of sections further comprises at the flat central body a reinforcement element positioned on an inner face toward the towing chain.

13. The machine according to claim 12, wherein each of the plurality of sections further comprises a deflector element for collecting and transferring the material, the deflector element being positioned at the flat central body.

14. The machine according to claim 13, wherein the deflector element comprises a plate arranged parallel to the plane of symmetry and positioned in a in the central area of the each of the plurality of sections.

15. The machine according to claim 14, wherein the plate extends from the central area towards respective side edges and defines folded wings having an inclination from the central area toward the respective side edges in the advancement direction.

16. The machine according to claim 13, wherein the deflector element of the overlying section has a lower height than the deflector element of the underlying section.

17. The machine according to claim 13, wherein the deflector element of the underlying section is positioned at an outer face of the central body, in a rearward position relative to the advancement direction adjacent the front end of an adjacent overlying section which follows the underlying section.

18. The machine according to claim 1, wherein the machine is at least one chosen from a padding machine and a crusher, and is adapted to cover the pipe with the material, the material being waste material from excavation for laying the pipe.

19. A lifting device for a machine for burying pipe, the lifting device configured to transfer material from a collection area to a storage area, the lifting device comprising:

a conveyor belt comprising:

a towing chain, a plurality of sections connected to the towing chain for moving the plurality of sections, the plurality of section including overlying sections alternating with underlying sections in such a way that one of the overlying sections is continuously in an outwardly overlapping relationship with both an adjacent one of the underlying sections that precedes the one of the overlying sections in an advancement direction of the conveyor belt and an adjacent one of the underlying sections that follows the one of the overlying sections in the advancement direction.

* * * * *